United States Patent [19]

Madden

[11] Patent Number: 4,587,806
[45] Date of Patent: May 13, 1986

[54] AREA TWO-DIMENSIONAL CONVERGING/DIVERGING NOZZLE

[75] Inventor: William M. Madden, Palm Springs, Fla.

[73] Assignee: United Technologies Corporation, Hartford, Conn.

[21] Appl. No.: 262,368

[22] Filed: May 11, 1981

[51] Int. Cl.[4] .............................................. F02K 1/12
[52] U.S. Cl. .................................. 60/271; 239/265.37; 244/12.5
[58] Field of Search ........................ 60/230, 232, 271; 239/265.35, 265.37, 265.39, 265.41, 265.33; 244/12.5, 216, 23 D

[56] References Cited

U.S. PATENT DOCUMENTS

| | | | |
|---|---|---|---|
| 2,799,989 | 7/1957 | Kappus | 239/265.37 |
| 3,098,352 | 7/1963 | Taub et al. | 239/265.37 |
| 3,387,788 | 6/1968 | Brown | 239/265.37 |
| 3,814,325 | 6/1974 | McCardle, Jr. et al. | 60/271 |
| 3,979,067 | 9/1976 | Nash | 239/265.35 |
| 4,000,854 | 1/1977 | Konarski et al. | 60/228 |
| 4,013,226 | 3/1977 | Willard | 239/265.37 |
| 4,361,281 | 11/1982 | Nash | 239/265.37 |

Primary Examiner—Louis J. Casaregola
Assistant Examiner—Jeffrey A. Simenauer
Attorney, Agent, or Firm—Stephen E. Revis

[57] ABSTRACT

A two-dimensional variable area convergent/divergent exhaust nozzle having the capability for wide throat area variation includes upper and lower spaced apart flap means. The upper flap means comprises an upstream converging flap having its rear edge hinged to the forward edge of a downstream diverging flap, wherein the nozzle is movable between maximum and minimum throat area positions by actuation means which includes guide means, such as cam tracks, for guiding the forward edge of the upstream flap to move downstream while simultaneously constraining both the upper flap means hinge joint and the rear edge of the diverging flap to move both downstream and closer to the engine axis. This type of motion permits large changes in throat area with minimal increase in the slope of the diverging flap permitting use of a shorter diverging flap. Preferably the forward and rearward edge of the converging flap move along circular arcs having the same center in order to minimize moments on the flap.

5 Claims, 4 Drawing Figures

AREA TWO-DIMENSIONAL CONVERGING/DIVERGING NOZZLE

DESCRIPTION

1. Technical Field

This invention relates to convergent/divergent exhaust nozzles for gas turbine engines.

2. Background Art

Two-dimensional convergent/divergent variable area exhaust nozzles with a veer flap extension for added thrust and control during forward flight and a deflector hood for redirecting the exhaust gases downwardly during short or vertical takeoffs are known in the art. One such nozzle is described in U.S. Pat. No. 3,979,067 to D. O. Nash. In that patent the forward thrust gas flow path is formed between a pair of upper flaps and a lower ventral flap. The upper flaps comprise an upstream flap, which pivots about a fixed axis at its upstream end, and a downstream flap which pivots about a fixed axis at its downstream end. The rear end of the upstream flap is joined to the forward end of the downstream flap by a cam and roller connection which allows that joint to move toward and away from the engine axis to vary the nozzle throat. One drawback to this arrangement is that the diverging angle of the downstream flap gets considerably steeper as the nozzle throat area becomes smaller. This may limit the possible turndown ratio (maximum throat area to minimum throat area) due to the boundary layer separating from the downstream flap.

The ventral flap of the Nash nozzle provides throat area control during both forward and vectored thrust. However, since hood and ventral flap pivot about the same axis, the ventral flap defines an essentially constant (i.e., unvarying) throat area between itself and the hood for all hood positions during thrust vectoring. This is an undesirable limitation.

Other patents which may be of more general interest as regards the state of the art are: U.S. Pat. No. 2,969,641 which shows translating/pivoting flaps for a three-dimensional nozzle for an outer annular secondary air flow; U.S. Pat. No. 3,367,579 which shows free floating translating/rotating divergent flaps for a three-dimensional convergent/divergent nozzle; and, U.S. Pat. No. 4,000,854 which shows a two-dimensional variable area convergent/divergent nozzle having an upper downstream flap pivotally connected at its forward end to the rearward end of a converging upstream flap, and having its rearward end pivotally connected to the downstream end of an outer airplane flap whose movement controls the angular orientation of the downstream flap. None of the foregoing utilize deflector hoods for thrust vectoring. A ventral-type flap which both translates and rotates to vary the throat area of a two-dimensional nozzle is shown in U.S. Pat. No. 4,013,226 to C. M. Willard.

DISCLOSURE OF INVENTION

One object of the present invention is an improved two-dimensional variable area converging/diverging exhaust nozzle.

Another object is a converging/diverging exhaust nozzle having a high turndown ratio.

Accordingly, a two-dimensional exhaust nozzle comprises upper and lower spaced apart movable flap means defining a convergent/divergent exhaust nozzle flow path wherein the upper flap means includes an upstream converging flap hinged at its rearward edge to a downstream diverging flap, and the nozzle is movable between maximum and minimum throat area forward thrust positions by actuation means comprising guide means guiding the forward edge of the upstream flap to move downstream while simultaneously constraining the hinge joint and rearward edge of the downstream flap to move both downstream and closer to the engine axis.

By this device the converging upstream flap may be moved from a large throat area position to a much smaller throat area position while the diverging downstream flap maintains a relatively shallow diverging angle throughout this movement to avoid boundary layer separation problems.

This nozzle may be used in any application calling for a variable area two dimensional convergent/divergent nozzle or, as shown herein, with a deflector hood and veer flap extension for vertical or short takeoffs. The combination of the convergent/divergent nozzle, deflector hood and veer flap is claimed in commonly owned U.S. patent application Ser. No. 06/262,367, now U.S. Pat. No. 4,392,615, titled "VTOL Exhaust Nozzle With Veer Flap Extension" by William M. Madden, filed on the same day herewith.

The foregoing and other objects, features and advantages of the present invention will become more apparent in the light of the following detailed description of the preferred embodiments thereof as shown in the accompanying drawing.

BEST MODE FOR CARRYING OUT THE INVENTION

Figure 1:
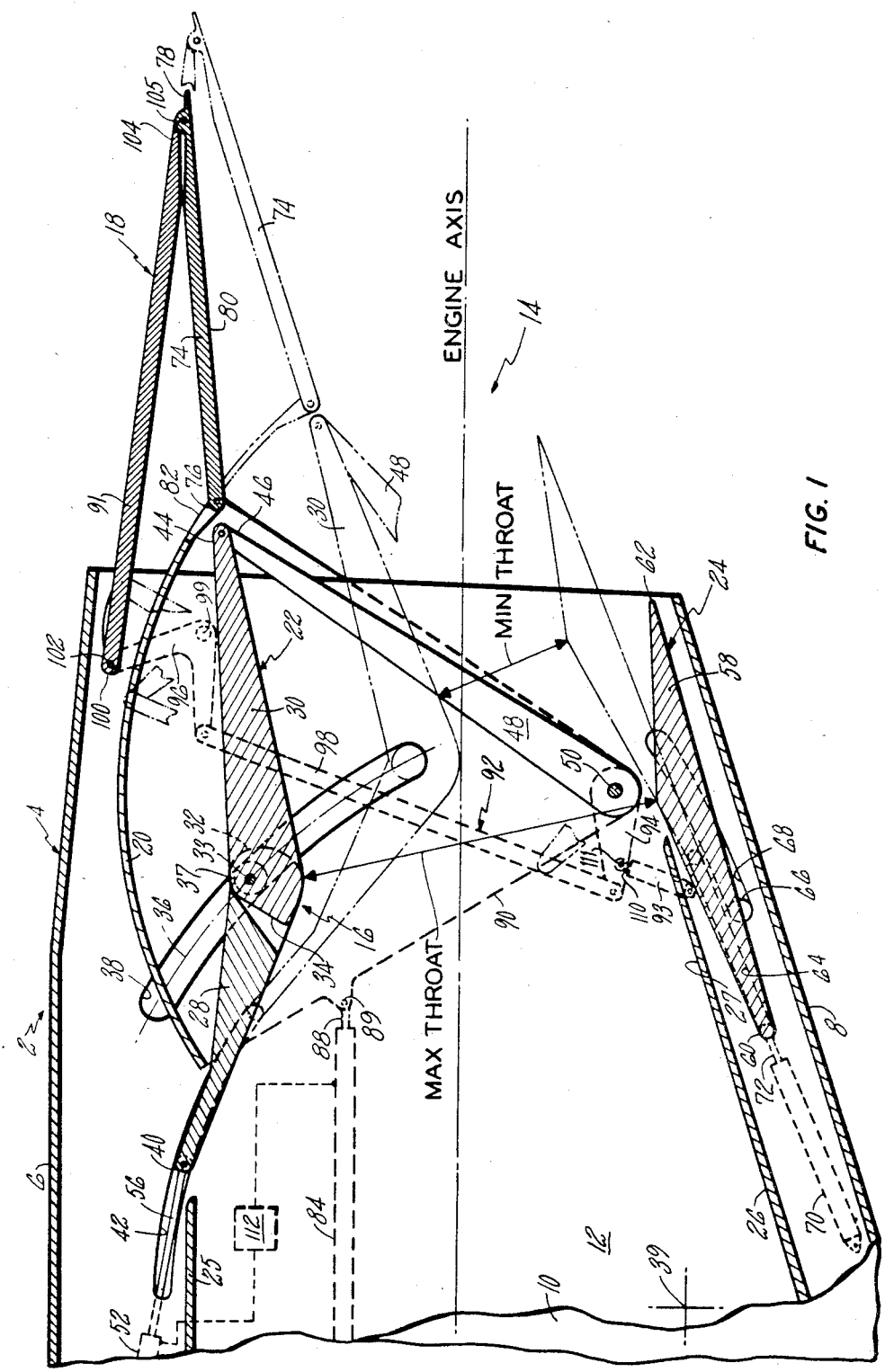
FIG. 1 is a schematic cross-sectional view of an exhaust nozzle assembly according to the present invention shown in a forward thrust mode.
Figure 2:
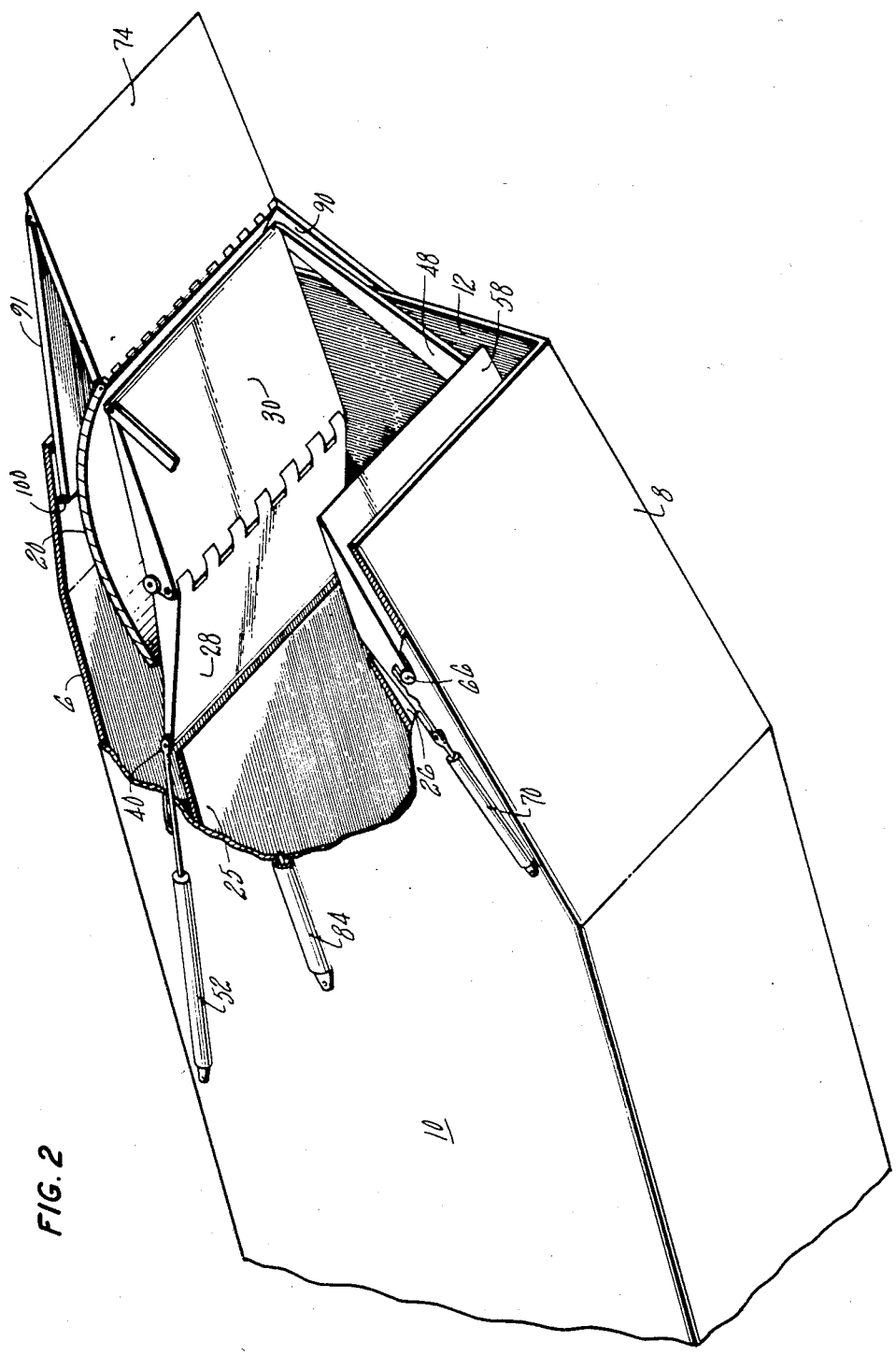
FIG. 2 is a perspective view, partly cut away, of the nozzle assembly of FIG. 1.

Referring to FIGS. 1 and 2, an exhaust nozzle assembly for a gas turbine engine is generally referred to by the reference numeral 2, and includes engine exhaust duct means 4 having opposed top and bottom walls 6, 8, respectively, side walls 10, 12, and upper and lower duct liners 25, 26. Disposed within and attached to the exhaust duct means 4 is an exhaust nozzle device 14. The exhaust nozzle device 14 includes a variable area converging/diverging nozzle 16, an external expansion device 18, and a hood-type deflector 20 to redirect the exhaust gas flow downwardly for vertical or short takeoffs. The nozzle assembly 2 of FIG. 1 is shown in its maximum throat area (solid lines) and minimum throat area (phantom lines) forward thrust positions. FIG. 2 is a perspective view of the nozzle assembly in its maximum throat area forward thrust position.

The converging/diverging nozzle 16 comprises upper flap means 22 and lower flap means 24. The upper and lower flap means 22, 24, in conjunction with the upper and lower duct liners 25, 26 and the side walls 10, 12, define an exhaust nozzle gas flow path 27. The upper flap means 22 includes an upstream flap 28 and a downstream flap 30. The rear edge 32 of the upstream flap 28 is hinged along an axis 33 to the front edge 34 of the downstream flap 30. The axis 33 is movable along an arc 36 by means of rollers 37 disposed on each side of the upper flap means 22 and which ride in tracks 38 in the side walls 10, 12. The forward edge 40 of the upstream flap 28 rides on rollers in arcuate tracks 42 in the side walls 10, 12. The rear edge 44 of the downstream flap 30 is pivotally connected to the ends 46 of a pair of follower links 48 disposed adjacent the side walls 10, 12. The follower links are pivotally mounted to the side walls for rotation about a fixed axis 50, thereby constraining the rearward edge of the downstream flap to move in a circular arc about the fixed axis 50 which is parallel to the downstream flap rearward edge and located below and upstream of the downstream flap rearward edge.

In this embodiment the tracks 38, 42 constrain the forward and rearward edges 40, 32 of the upstream flap 28 to move in circular arcs about a common axis 39. This helps balance pressure loads on the flap 28 to minimize moments. Other track shapes may, however, be used wherein as the converging/diverging nozzle 16 is moved from a maximum to minimum throat area position, the forward edge 40 of the upstream flap moves downstream (but not necessarily parallel to the engine axis) while the rearward edge 32 moves downstream and toward the engine axis to a point below its original position while the flap 28 maintains a converging angle with respect to the engine axis.

The lower flap means 24, in this embodiment, comprises a single ventral flap 58 extending between the side walls 10, 12 and having a front edge 60 and rear edge 62. The front edge 60 of the ventral flap 58 is movable upstream and downstream within straight tracks 64 in the side walls 10, 12. Rollers 66 attached to the ventral flap 58 between its front and rear edges 60, 62 ride in curved cam tracks 68 in the side walls 10, 12.

Positioning of the upper flap means 22 is accomplished by means of a pair of first actuators 52, one actuator of said pair being pivotally connected to the side wall 10 and the other (not shown) being pivotally connected to the side wall 12. An actuation rod 56 of each actuator 52 is pinned to the forward edge 40 of the upstream flap 28, and its movement controls the position of the foward edge 40 within the track 42 and thus the position of the upper flap means 22.

A pair of spaced apart second actuators 70 mounted on the side walls 10, 12 have their actuation rods 72 pinned to the forward edge 60 of the ventral flap 58 and move the forward edge 60 within the tracks 64. The tracks 64, 68 along with the position of the actuation rods 72 control the position and orientation of the ventral flap, which moves both upstream and downstream as well as toward and away from the engine axis.

From the foregoing it is apparent that the upper flap means 22 and the lower flap means 24 cooperate with each other to vary the throat and exit area of the converging/diverging exhaust nozzle flow path 27. As can be seen by comparing the maximum and minimum forward thrust throat areas, the linkage defining the upper flap means 22 offers the advantage of providing a very large turndown ratio, while maintaining a relatively shallow diverging flap (30) angle. Thus, this configuration avoids the need for a long diverging flap to reduce flap angle and prevent boundary layer separation.

Cooperating with the variable area converging/diverging nozzle 16 is the external expansion device 18. The expansion device 18 includes a veer flap 74 having a front edge 76, a rear edge 78, and an expansion surface 80. The front edge 76 is pivotally connected to the rear edge 82 of the deflector 20 and is parallel to the rear edge 44 of the downstream flap 30. A pair of third actuators 84 (only one being shown) are pivotally mounted to the exhaust duct means side walls 10, 12, respectively. The actuation rods 88 of the actuators 84 are pinned at 89 to side wall panels 90 of the deflector 20. The position of the front edge 76 of the veer flap 74 is thereby controlled by the position of the deflector 20 which is rotated about the axis 50 by the third actuators 84.

The position of the rear edge 78 of the veer flap 74, and thus the angular orientation of the expansion surface 80, is independently adjustable linkage means comprising an airplane flap 91, a four bar linkage 92 adjacent each side wall 10, 12, and a pair of fourth actuators 93 (only one being shown) pivotally mounted to the side walls. Each four bar linkage 92 comprises a lower drive crank 94, an upper follower crank 96, and a connecting rod 98. The front edge 100 of the airplane flap 91 is pivotally connected along an axis 102 to the upper cranks 96; and the rear edge 104 of the airplane flap 91 is pivotally connected to the rear edge 78 of the veer flap 74 along an axis 105. The lower cranks 94 pivot about the fixed axis 50, while the upper cranks 96 are each pivotally mounted to the exhaust duct means 4 through a cantilevered support bracket 108 (FIG. 4) so as to rotate about a fixed axis 99. Actuation rods 110 of the actuators 93 are pinned at 111 to the lower cranks 94. Thus, the fourth actuators 93, in conjunction with the hood actuators 84, control the position of the rear edge 78 of the veer flap 74.

During forward thrust operation the throat area of the exhaust nozzle flow path 27 is controlled by the position of the first and second actuators 52, 70. The third actuators 84, which rotate the deflector 20, are synchronized with the first actuators 52 such that the front edge 76 of the veer flap 74 remains adjacent the rear edge 44 of the downstream flap 30. Synchronization may be provided by any suitable control means 112 interconnecting these actuators. Simultaneously, or at any other time, the fourth actuators 93 adjust the position of the rear edge 78 of the veer flap 74 to trim the position of expansion surface 80 in order to maximize thrust. Throughout this possible limited movement of the deflector 20 during forward thrust operation the deflector 20 is considered to be stowed since it is above the upper flap means 22 and out of the gas path.

Note that if the converging/diverging nozzle 16 shown in the drawing were to be used without an expansion device 18, there would be no requirement that the rearward edge 44 of the downstream flap 30 move in a circular arc. In that case any motion which would still provide the converging/diverging nozzle 16 with the benefit of a large turndown ratio without separation of the boundary layer from the surface of the downstream flap 30, would be acceptable. Preferably such movement will be from a first position wherein the downstream flap forms a diverging angle with respect to the engine axis, to a second position wherein its downstream edge is further downstream and below its first position. The object is to reduce the throat area while preventing the diverging angle from becoming too steep as the forward edge of the downstream flap moves closer to the engine axis.

Figure 3:
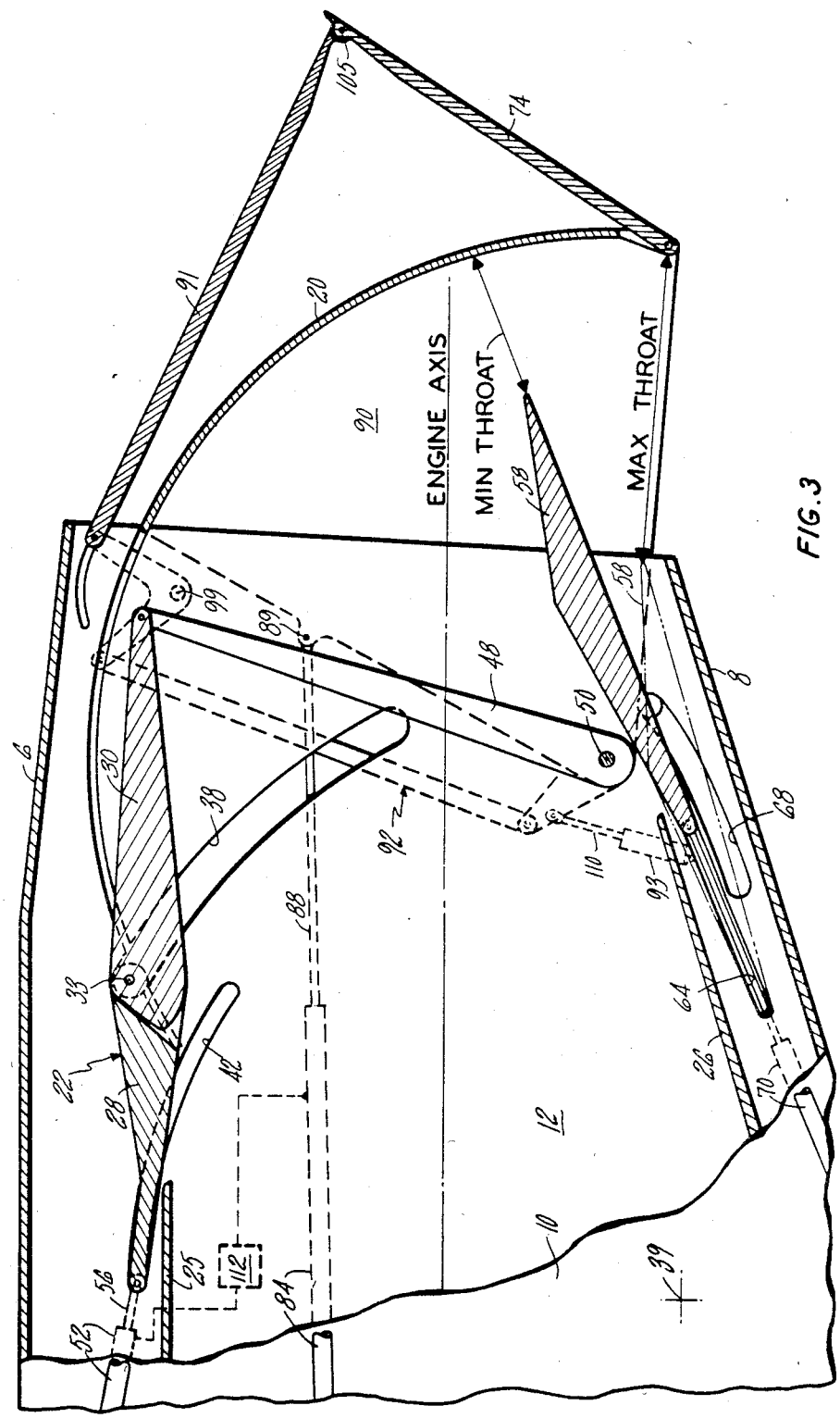
FIG. 3 is a schematic cross-sectional view of the exhaust nozzle assembly of FIG. 1 shown in a vertical thrust mode.
Figure 4:
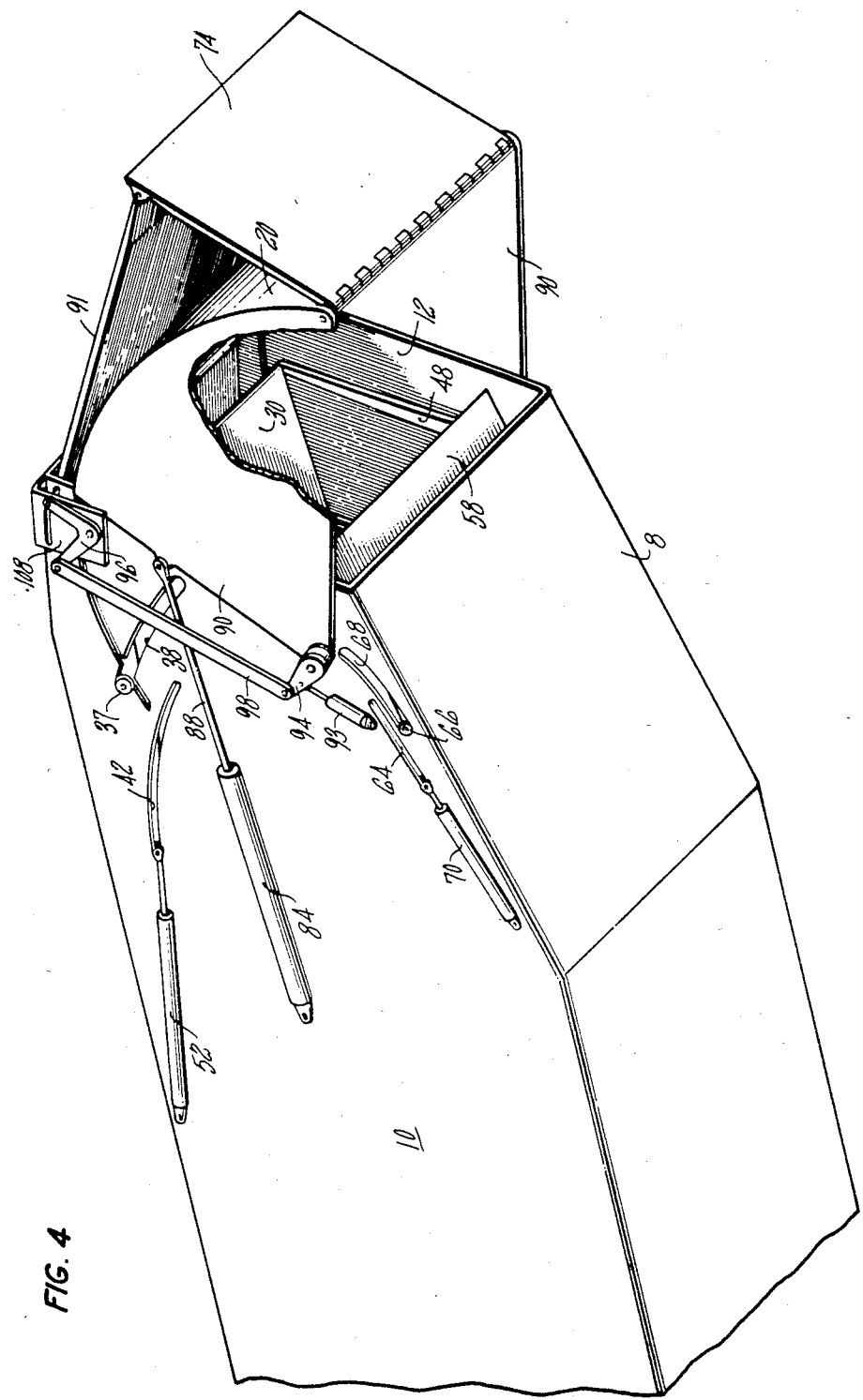
FIG. 4 is a perspective view, partly cut away, of the nozzle assembly in the vertical thrust mode.

Referring to the cross section of FIG. 3 and the perspective view of FIG. 4, for vertical thrust the deflector 20 is rotated clockwise to its deployed position wherein it deflects the exhaust gases in a downward direction. Because it is undesirable to turn supersonic flow inside the exhaust nozzle assembly 2, during vertical thrust the upper flap means 22 is moved to its most open position (shown in FIG. 3) used only during vectored thrust to maximize the cross-sectional area of the flow path 27 within the converging/diverging nozzle 16. When in that position the rear edge 62 of the ventral flap 58, in combination with the deflector 20, defines the nozzle throat area, which may be varied by actuation of the ventral flap 58. FIG. 3 shows the minimum (solid lines) and maximum (phantom lines) throat areas for the vertical thrust mode. In FIG. 4 the ventral flap 58 is shown fully retracted to define the maximum throat area for vertical thrust. Also, in the vertical thrust mode the airplane flap 91 and the veer flap 74 define an external surface for the downstream end of the exhaust nozzle assembly 2.

It will be apparent to those persons having ordinary skill in the art that many variations and modifications may be made to the exhaust nozzle assembly 2 while remaining within the scope of the present invention. For example, because the tracks 38, 42 have the same center of curvature, they may be replaced by a link rigidly attached to the upstream flap 28 and pivotally attached to the exhaust duct means 4 along the axis 39. A four bar linkage would thereby be formed consisting of this link (including the upstream flap), the follower link 48, and the downstream flap 30; and rotation of the four bar linkage by an actuator would result in motion of the upper flap means 22 which is identical to the motion which occurs using the tracks 38, 42.

It is also possible to eliminate the fourth actuators 93 by coupling the lower crank 94 to the follower link 48 so they rotate together at least through forward thrust positions of the upper flap means 22. Appropriate selection of the lengths of the cranks 94, 96, the connecting rod 98, and the airplane flap 91 can provide a fixed schedule of orientation for the expansion surface 80 such that it is always substantially aligned with the surface of the downstream flap 30; however, the ability to trim the orientation of the expansion surface 80 would be lost.

It is also possible to eliminate the four bar linkage 92 comprising the cranks 94, 96 and the connecting rod 98. Instead, a separate actuator mounted to the inside of the top wall 6 of the exhaust duct means 4 may have its actuator rod connected directly to the front edge 100 of the airplane flap 91 and could be used to trim the position of the veer flap 74.

It should also be apparent from the foregoing description of the present invention that the expansion device 18 in combination with the deflector 20 may be used with any variable area two-dimensional converging-/diverging nozzle having a downstream upper flap with a rear edge which moves in a circular arc about the same fixed axis as the axis about which the hood rotates.

Although the invention has been shown and described with respect to a preferred embodiment thereof, it should be understood by those skilled in the art that other various changes and omissions in the form and detail thereof may be made therein without departing from the spirit and the scope of the invention.

What is claimed is:

1. A two-dimensional variable area exhaust nozzle assembly for a gas turbine engine, said engine having an axis and comprising:
exhaust duct means having opposed, fixed, side walls;
variable position exhaust nozzle means disposed within said exhaust duct means, said nozzle means including upper flap means and lower flap means opposed to said upper flap means, said upper and lower flap means and said side walls together defining a converging/diverging exhaust nozzle gas flow path, said nozzle means having a forward end and rearward end, said forward end being upstream of said rearward end;
said upper flap means comprising a movable upstream flap having a forward edge and rearward edge and a movable downstream flap having a forward edge and rearward edge, said forward edge of said downstream flap being hinged along a first axis to said rearward edge of said upstream flap for rotation of said downstream flap about said first axis;
first actuation means associated with said upper flap means for moving and guiding said upper flap means to vary the throat area of said nozzle means, said actuation means comprising guide means for guiding the movement of said upper flap means between
(A) a maximum throat area first position wherein
(i) said upstream flap forms a converging angle with respect to the engine axis, and
(ii) said downstream flap forms a diverging angle with respect to the engine axis; and
(B) a minimum throat area second position wherein
(i) said forward edge of said upstream flap is downstream of its first position and said upstream flap forms a converging angle with respect to the engine axis; and
(ii) said forward and rearward edges of said downstream flap are both downstream of their first positions and closer to the engine axis; and
second actuation means connected to said lower flap means for moving said lower flap means between first and second positions to vary the throat area of said nozzle means, wherein said guide means for guiding the movement of said upper flat means includes means constraining said rearward edge of said downstream flap to move in a circular arc about another fixed axis, said other axis being parallel to said downstream flap rearward edge and located upstream of said downstream flap rearward edge.

2. A two-dimensional variable area exhaust nozzle assembly for a gas turbine engine, said engine having an axis and comprising:
exhaust duct means having opposed, fixed, side walls;
variable position exhaust nozzle means disposed within said exhaust duct means, said nozzle means including upper flap means and lower flap means opposed to said upper flap means, said upper and lower flap means and said side walls together defining a converging/diverging exhaust nozzle gas flow path, said nozzle means having a forward end and rearward end, said forward end being upstream of said rearward end;
said upper flap means comprising a movable upstream flap having a forward edge and rearward edge and a movable downstream flap having a forward edge and rearward edge, said forward edge of said downstream flap being hinged along a first axis to said rearward edge of said upstream flap for rotation of said downstream flap about said first axis;

first actuation means associated with said upper flap means for moving and guiding said upper flap means to vary the throat area of said nozzle means, said actuation means comprising guide means for guiding the movement of said upper flap means between
(A) a maximum throat area first position wherein
  (i) said upstream flap forms a converging angle with respect to the engine axis, and
  (ii) said downstream forms a diverging angle with respect to the engine axis; and
(B) a minimum throat area second position wherein
  (i) said forward edge of said upstream flap is downstream of its first position and said upstream flap forms a converging angle with respect to the engine axis; and
  (ii) said forward and rearward edges of said downstream flap are both downstream of their first positions and closer to the engine axis; and
second actuation means connected to said lower flap means for moving said lower flap means between first and second positions to vary the throat area of said nozzle means, wherein said guide means for guiding the movement of said upper flap means includes means constraining said upstream flap forward edge and upstream flap rearward edge to move in circular arcs about a common fixed second axis, said second axis being parallel to said first axis, and means constraining said rearward edge of said downstream flap to move in a circular arc about a fixed third axis, said third axis being parallel to said first axis and located upstream of said downstream flap rearward edge.

3. The variable area exhaust nozzle assembly according to claims 1, wherein said guide means for guiding the movement of said upper flap means comprises first track means and second track means associated with said side walls, wherein said forward edge of said upstream flap includes rollers which ride in said first track means and said rearward edge of said upstream flap includes rollers which ride in said second track means.

4. A two-dimensional variable area exhaust nozzle assembly for a gas turbine engine, said engine having an axis and comprising:
exhaust duct means having opposed, fixed, side walls;
variable position exhaust nozzle means disposed within said exhaust duct means, said nozzle means including upper flap means and lower flap means opposed to said upper flap means, said upper and lower flap means and said side walls together defining a converging/diverging exhaust nozzle gas flow path, said nozzle means having a forward end and rearward end, said forward end being upstream of said rearward end;
said upper flap means comprising a movable upstream flap having a forward edge and rearward edge and a movable downstream flap having a forward edge and rearward edge, said forward edge of said downstream flap being hinged along a first axis to said rearward edge of said upstream flap for rotation of said downstream flap about said first axis;
first actuation means associated with said upper flap means for moving and guiding said upper flap means to vary the throat area of said nozzle means, said actuation means comprising guide means for guiding the movement of said upper flap means between
(A) a maximum throat area first position wherein
  (i) said upstream flap forms a converging angle with respect to the engine axis, and
  (ii) said downstream flap forms a diverging angle with respect to the engine axis; and
(B) a minimum throat area second position wherein
  (i) said forward edge of said upstream flap is downstream of its first position and said upstream flap forms a converging angle with respect to the engine axis; and
  (ii) said forward and rearward edges of said downstream flap are both downstream of their first positions and closer to the engine axis; and
second actuation means connected to said lower flap means for moving said lower flap means between first and second positions to vary the throat area of said nozzle means, a rigid link pivotally connected at one end to said downstream flap rearward edge, and pivotally connected at its other end to said exhaust duct means for rotation about another fixed axis, said other axis being parallel to said downstream flap reversed edge and located below and upstream of said downstream flap rearward edge.

5. A two-dimensional variable area exhaust nozzle assembly for a gas turbine engine, said engine having an axis and comprising:
exhaust duct means having opposed, fixed, side walls;
variable position exhaust nozzle means disposed within said exhaust duct means, said nozzle means including upper flap means and lower flap means opposed to said upper flap means, said upper and lower flap means and said side walls together defining a converging/diverging exhaust nozzle gas flow path, said nozzle means. having a forward end and rearward end, said forward end being upstream of said rearward end;
said upper flap means comprising a movable upstream flap having a forward edge and rearward edge and a movable downstream flap having a forward and rearward edge, said forward edge of said downstream flap being hinged along a first axis to said rearward edge of said upstream flap for rotation of said downstream flap about said first axis;
first actuation means associated with said upper flap means for moving and guiding said upper flap means to vary the throat area of said nozzle means, said actuation means comprising guide means for guiding the movement of said upper flap means between
(A) a maximum throat area first position wherein
  (i) said upstream flap forms a converging angle with respect to the engine axis, and
  (ii) said downstream flap forms a diverging angle with respect to the engine axis; and
(B) a minimum throat area second position wherein
  (i) said forward edge of said upstream flap is downstream of its first position and said upstream flap forms a converging angle with respect to the engine axis; and
  (ii) said forward and rearward edges of said downstream flap are both downstream of their first positions and closer to the engine axis; and
second actuation means connected to said lower flap means for moving said lower flap means between first and second positions to vary the throat area of said nozzle means wherein said guide means for guiding the movement of said upper flap means includes;
(A) means constraining said upstream flap forward edge and upstream flap rearward edge to move in circular arcs about a common fixed second axis, said second axis being parallel to said downstream flap rearward edge and located upstream of said downstream flap rearward edge; and
(B) a rigid link pivotally corrected at one end to said downstream flap rearward edge, and pivotally connected at its other end to said exhaust duct means for rotation about a third axis.

* * * * *